United States Patent [19]
Gardiner

[11] Patent Number: 6,148,684
[45] Date of Patent: Nov. 21, 2000

[54] ANTI-BACKLASH GEAR

[75] Inventor: John Patrick Gardiner, Londonderry, N.H.

[73] Assignee: Heidelberger Druckmaschinen Aktiengesellschaft, Heidelberg, Germany

[21] Appl. No.: 09/265,621

[22] Filed: Mar. 10, 1999

[51] Int. Cl.[7] .................................................. F16H 55/18
[52] U.S. Cl. ............................. 74/440; 74/409; 101/216
[58] Field of Search ........................... 74/440, 409, 441; 101/216, 217

[56] References Cited

U.S. PATENT DOCUMENTS

| 5,357,858 | 10/1994 | Guaraldi et al. | 101/216 |
| 5,813,335 | 9/1998 | Burke et al. | 101/217 |

FOREIGN PATENT DOCUMENTS

| 0113154 | 4/1990 | Japan | 74/440 |

*Primary Examiner*—Charles A Marmor
*Assistant Examiner*—Tisha D. Waddell
*Attorney, Agent, or Firm*—Herbert L. Lerner; Laurence A. Greenberg; Werner H. Stemer

[57] ABSTRACT

An anti-backlash gear assembly includes a drive gear that is fixably mountable on a drive shaft that drives the drive gear and has a plurality of drive gear clearance holes. A rod ring is fixed to one side of the drive gear. A flank gear having a plurality of flank gear clearance holes corresponding to the drive gear clearance holes is also mounted on the drive shaft adjacent to the drive gear. A force ring having a plurality of receiving holes is mounted to the flank gear. Springs having a first end fixed to the rod ring and extend through the drive gear clearance holes, the flank gear clearance holes, and into the receiving holes. The springs exert a force biasing the flank gear and the drive gear to rotate in opposite directions.

10 Claims, 3 Drawing Sheets

ANTI-BACKLASH GEAR

BACKGROUND OF THE INVENTION

1. Field of the Invention

The invention relates, generally, to an anti-backlash gear and more specifically, to anti-backlash gears for industrial machinery such as printing presses.

2. Description of the Related Art

Anti-backlash gearing is commonly used in gear trains of instruments and in mechanical computing devices. Gears of this type are well known and are sold in numerous instrument related catalogues. However, these classes of anti-backlash gears are not useful in power transmissions of high speed machinery.

High performance, high horsepower, servo motors used in printing presses create a requirement for gearing that can apply both accelerating and decelerating torque without introducing a following positional error such as would be introduced by normal gear backlash. The gear teeth that mesh between a first gear and a corresponding second gear, such as between a driving gear and a driven gear of a gear train, have a tendency to separate circumferentially when the gears rotate at very high speeds and have backlash problems when torque values are changed on the drive gear.

U.S. Pat. No. 5,813,335 to Burke et al. (Burke) exemplifies the prior art developments to eliminate the backlash problem. Burke teaches a drive gear and a supplemental gear. The supplemental gear has a recess formed therein for housing a leaf spring assembly. The leaf spring assembly biases the teeth of the supplemental gear to rotate opposite the teeth of the drive gear in order to prevent backlash with the teeth of a driven gear. However, the supplemental gear has to be of a minimum size (diameter) in order to house the leaf spring and the leaf springs for developing the anti-backlash forces are short in length and therefore have a high spring rate which is undesirable. In addition, the complexity of the accuracy requirements of the configuration leads to high production costs.

SUMMARY OF THE INVENTION

It is accordingly an object of the invention to provide an anti-backlash gear which overcomes the herein-mentioned disadvantages of the heretofore-known devices of this general type, in which a less complex construction is provided, the diameter of the gear can be reduced, and the spring rate of the springs can also be reduced.

With the foregoing and other objects in view there is provided, in accordance with the invention, an anti-backlash gear assembly, including: a drive gear having a plurality of drive gear clearance holes formed therein and fixably mountable on a drive shaft for driving the drive gear; a rod ring fixed to the drive gear; a flank gear having a plurality of flank gear clearance holes formed therein and corresponding to the drive gear clearance holes; a force ring having a plurality of receiving holes formed therein and mounted to the flank gear; and cantilever rod springs having a first end fixed to the rod ring and extending through the plurality of drive gear clearance holes, the plurality of flank gear clearance holes and into the plurality of receiving holes, the springs exerting a force biasing the flank gear and the drive gear to rotate in opposite directions.

In accordance with an additional feature of the invention, the plurality of drive gear clearance holes, the plurality of flank gear clearance holes, and the plurality of receiving holes are all rotationally offset with respect to each other.

In accordance with another feature of the invention, the springs extend through the plurality of drive gear clearance holes without contacting the drive gear and through the plurality of flank gear clearance holes without contacting the flank gear.

In accordance with a further added feature of the invention, the flank gear has a hub mounting the force ring.

In accordance with a further additional feature of the invention, the springs are spring rods, and the spring rods are deflected in a cantilevered fashion as the rod springs extend from the rod ring to the force ring for exerting the force biasing the flank gear and the drive gear to rotate in opposite directions.

In accordance with another added feature of the invention, the force ring has a circumference with a notch formed therein shaped to receive a wrench for rotating the force ring.

In accordance with another additional feature of the invention, the flank gear is mounted on the drive shaft coaxially and adjacent the drive gear, the flank gear rotating freely about the drive shaft.

In accordance with an added feature of the invention, the drive gear has a bore formed therein, and including a bushing disposed in the bore of the drive gear.

In accordance with an additional feature of the invention, the bushing has a conically, step-shaped interior hole formed therein and the flank gear has a threaded pin bore formed therein, and including a threaded pin having a guide end matching the conically, step shaped interior hole of the bushing and a threaded end disposed in the threaded pin bore, the threaded pin acting in conjunction with the bushing for the dual purposes of, in a first position, aligning the flank gear with the drive gear, and, in a second position, limiting a movement of the flank gear relative to the drive gear.

In accordance with a concomitant feature of the invention, the force ring has a force ring bore formed therein alignable with the threaded pin bore of the flank gear for allowing access to the pin disposed in the threaded pin bore.

Other characteristic features of the invention are set forth in the appended claims.

Although the invention is illustrated and described herein as embodied in an anti-backlash gear, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE PREFERRED EMBODIMENTS

Figure 1:
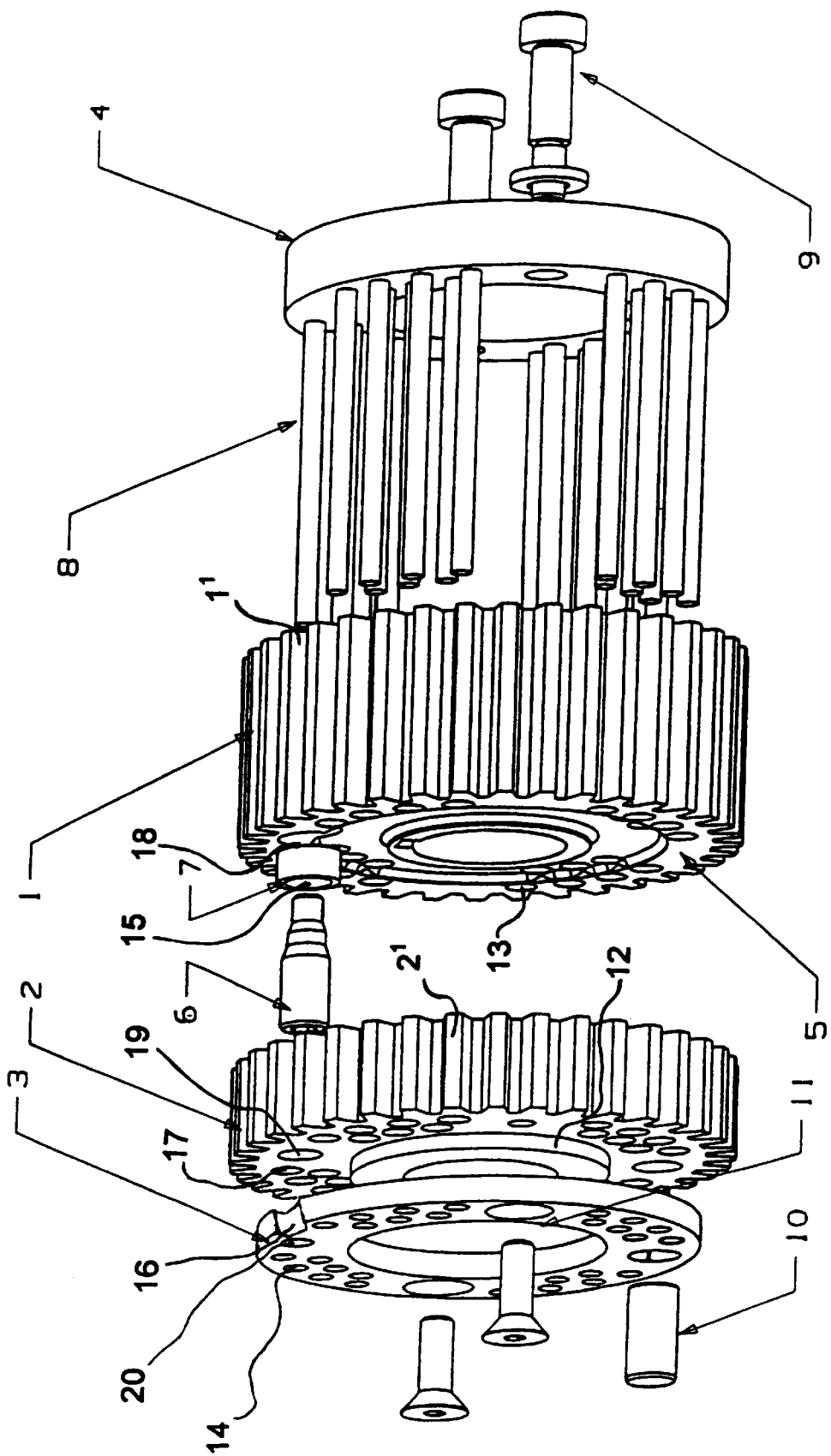
FIG. 1 is an exploded, perspective, diagrammatic view of an anti-backlash gear according to the invention.

In all the figures of the drawing, sub-features and integral parts that correspond to one another bear the same reference symbol in each case. Referring now to the figures of the drawings in detail and first, particularly, to FIG. 1 thereof, there is shown an exploded, perspective view of an anti-backlash gear assembly. The anti-backlash gear assembly includes a drive gear 1 having teeth 1' and a flank gear 2 having teeth 2' that develops an anti-backlash torque component. The drive gear 1 and the flank gear 2 are to be coaxially mounted on a common shaft adjacent one another, and commonly meshing with a non-illustrated driven third gear having sufficient face width to engage the teeth 1', 2' of both of the coaxially mounted gears 1, 2. The teeth 1' of the drive gear 1 bear against one side of the teeth of the third gear while the teeth 2' of the flank gear 2 bear against the opposite side of the teeth of the third gear. The drive gear 1 is rigidly fixed to the common shaft and the flank gear 2 is free to rotate.

A rod ring 4 is mounted to one side of the drive gear 1 via shoulder bolts 9 which accurately lock the rod ring 4 in place on the drive gear 1. A plurality of spring rods 8 are rigidly mounted in the rod ring 4 and extend in a cantilevered fashion from the rod ring 4 into clearance holes 13, 17 formed in both the drive gear 1 and the flank gear 2, respectively. The spring rods 8 pass through the clearance holes 13, 17 of the drive gear 1 and the flank gear 2 without touching either gear 1, 2 and function as a cantilever beam or spring for providing the anti-backlash torque. The clearance holes 13, 17 in each gear 1, 2 are rotationally offset to allow for the bending of the spring rods 8. A force ring 3 is rotationally located around a hub 12 of the flank gear 2 and further rotationally positioned by a locating pin 10 insertable through the force ring 3 and into a bore formed in the flank gear 2. The force ring 3 is further held in place on the flank gear 2 by two screws 11. The force ring 3 also has a plurality of rotationally offset receiving holes 14 corresponding to the clearance holes 17 of the flank gear 2 and receives the spring rods 8 protruding from the flank gear 2. The force ring 3 is mounted on the flank gear 2 such that the receiving hole locations require that the spring rods 8 bend in the manner of a cantilever in order to pass through the receiving holes 14. The plane of deflection of the cantilevered spring rod 8 is perpendicular to the radial of the anti-backlash gear assembly. The deflection results in a torque between the two adjacent gears 1, 2. By placing a plurality of the spring rods 8 in a circular array, a large anti-backlash torque value is generated.

The spring rods 8 between the two coaxially mounted gears 1, 2 provide a torsional force between the gears 1, 2. In a static condition each gear 1, 2 applies the same tooth contact force to the teeth of the non-illustrated third gear, but in opposite directions so that there is no net driving force of the third gear. When a driving force is applied to the drive gear 1, this balance is removed and a net driving force causes motion and an increase in tooth contact of the rigidly fixed drive gear 1. If an opposite torque is applied, the tooth contact force of the drive gear 1 decreases but remains greater than zero to maintain tooth contact up to the limit of the spring force of the spring rods 8.

For performing the functions of aligning the flank gear 2 during the installation or removal procedure of the anti-backlash gear assembly, and to limit the maximum displacement of the gear teeth 1', 2' relative to each other there is provided a hardened bushing 7 and a pin 6. The hardened bushing 7 is pressed into a counter bore 18 formed in the side of the drive gear 1. The hardened bushing 7 has a lead-in conical surface 15 matching one end of the pin 6 to provide for the transition between the functions of flank gear alignment and limiting the travel of the teeth 1', 2' relative to each other. The pin 6 is installed in a threaded hole 19 formed in the flank gear 2. The travel path of the pin 6 away from the hardened bushing 7 is limited by the force ring 3. The force ring 3 has a hole 20 formed therein which is large enough to allow access to a hex head of the pin 6 but is narrower than the pin 6. In this manner, the position of the pin 6 can be adjusted by an adjusting wrench via the hole 20 in the force ring 3. This assures that the pin 6 can be properly adjusted in its location to provide proper travel so that its dual functions can be performed.

The force ring 3 is formed with a notch 16. The notch 16 is configured to be engaged by a wrench for rotating the force ring 3.

Figure 2:
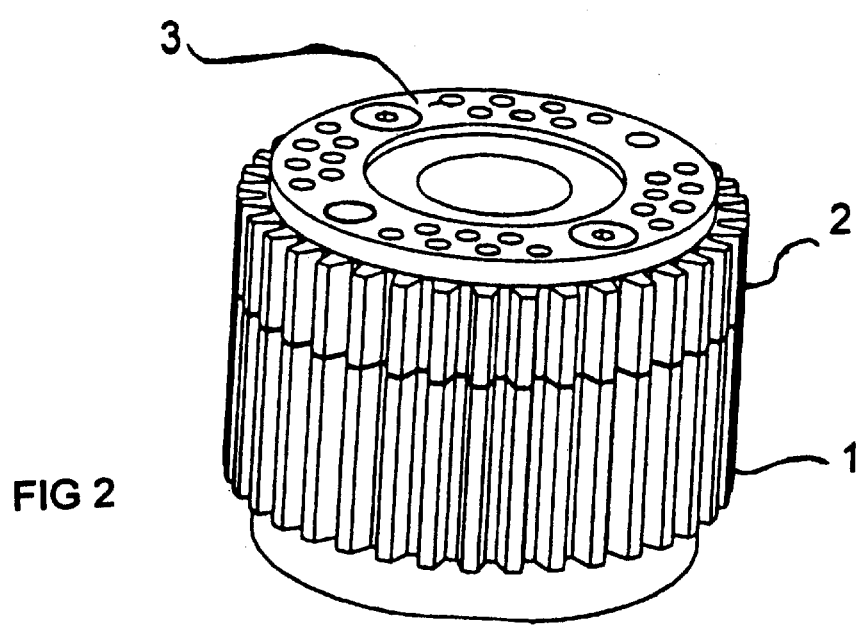
FIG. 2 is a top, perspective view of the anti-backlash gear in an assembled state.

FIG. 2 shows a perspective view of the anti-backlash gear assembly in an assembled state.

Figure 3:
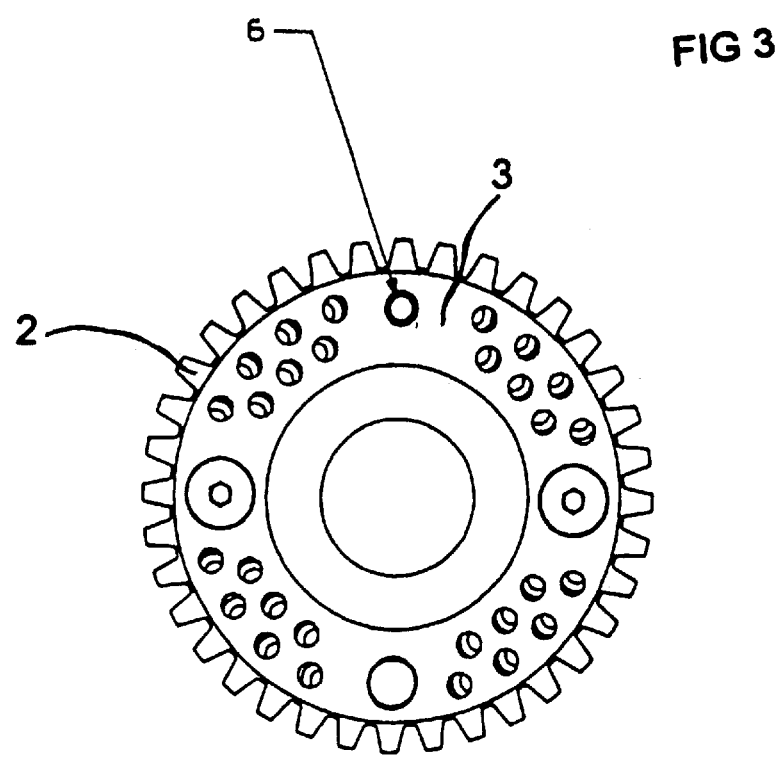
FIG. 3 is a front elevational view of the anti-backlash gear.

FIG. 3 shows a front elevational view of the assembled anti-backlash gear assembly as viewed from the force ring 3.

Figure 4:
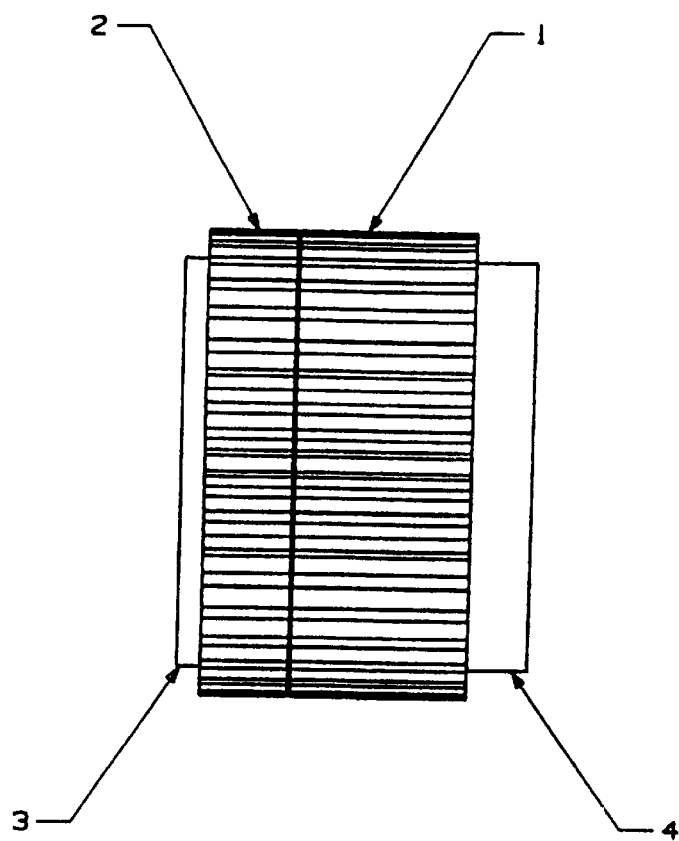
FIG. 4 is a side-elevational view of the anti-backlash gear.

FIG. 4 is a side elevational view of the assembled anti-backlash gear assembly.

Figure 5:
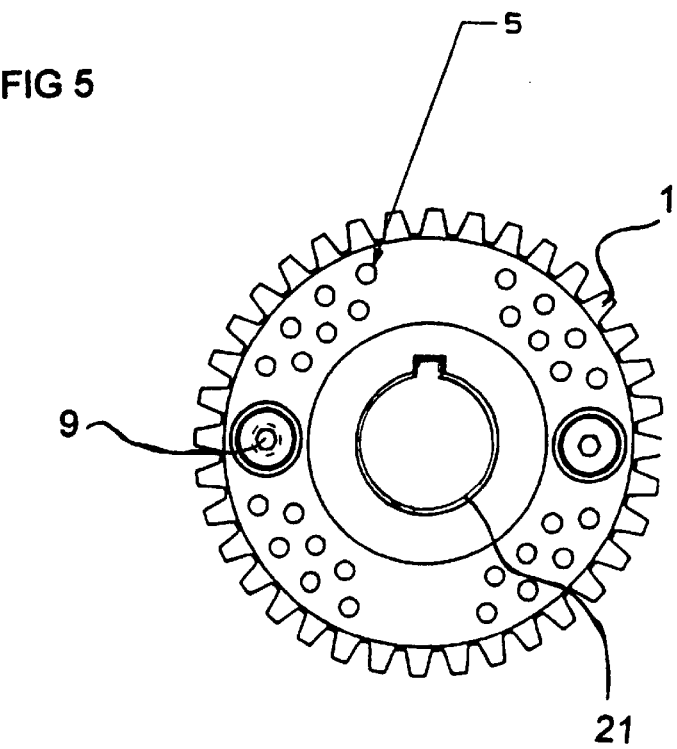
FIG. 5 is rear elevational view of the anti-backlash gear.

FIG. 5 is a rear elevation view of the assembled anti-backlash gear assembly as viewed from the ring rod 4 mounted on a drive shaft 21.

A further application of the invention would be for use in soft, quiet, compliant type drive applications. In such an environment, the spring rods 8 would transmit torque between a driven gear and a driving gear. The low spring rate coupled with a large driven mass would provide a low resonant frequency that is desirable for attenuating drive disturbances.

I claim:

1. An anti-backlash gear assembly, comprising:
   a drive gear having a plurality of drive gear clearance holes formed therein and fixably mountable on a drive shaft for driving said drive gear;
   a rod ring fixed to said drive gear;
   a flank gear having a plurality of flank gear clearance holes formed therein corresponding to said drive gear clearance holes;
   a force ring having a plurality of receiving holes formed therein and mounted to said flank gear; and
   springs having a first end fixed to said rod ring and extending through said plurality of drive gear clearance holes, said plurality of flank gear clearance holes and into said plurality of receiving holes, said springs exerting a force biasing said flank gear and said drive gear to rotate in opposite directions.

2. The anti-backlash gear assembly according to claim 1, wherein said plurality of drive gear clearance holes, said plurality of flank gear clearance holes, and said plurality of receiving holes are all rotationally offset with respect to each other.

3. The anti-backlash gear assembly according to claim 2, wherein said springs extend through said plurality of drive gear clearance holes without contacting said drive gear and through said plurality of flank gear clearance holes without contacting said flank gear.

4. The anti-backlash gear assembly according to claim 1, wherein said flank gear has a hub mounting said force ring.

5. The anti-backlash gear assembly according to claim 1, wherein said springs are spring rods, and said spring rods are deflected in a cantilevered fashion as said rod springs extend from said rod ring to said force ring for exerting the force biasing said flank gear and said drive gear to rotate in opposite directions.

6. The anti-backlash gear assembly according to claim 1, wherein said force ring has a circumference with a notch formed therein shaped to receive a wrench for rotating said force ring.

7. The anti-backlash gear assembly according to claim 1, wherein said flank gear is mounted on the drive shaft coaxially and adjacent said drive gear, said flank gear rotating freely about said drive shaft.

8. The anti-backlash gear assembly according to claim 1, wherein said drive gear has a bore formed therein, and including a bushing disposed in said bore of said drive gear.

9. The anti-backlash gear assembly according to claim 8, wherein said bushing has a conically, step-shaped interior hole formed therein and said flank gear has a threaded pin bore formed therein, and including a threaded pin having a guide end matching said conically, step-shaped interior hole of said bushing and a threaded end disposed in said threaded pin bore, said threaded pin acting in conjunction with said bushing for aligning said flank gear with said drive gear and limiting a movement of said flank gear relative to said drive gear.

10. The anti-backlash gear assembly according to claim 9, wherein said force ring has a force ring bore formed therein alignable with said threaded pin bore of said flank gear for allowing access to said pin disposed in said threaded pin bore.

\* \* \* \* \*